United States Patent [19]

Kruse et al.

[11] Patent Number: 5,023,309
[45] Date of Patent: Jun. 11, 1991

[54] WATER DISPERSIBLE, MODIFIED POLYURETHANE THICKENER WITH IMPROVED HIGH SHEAR VISCOSITY IN AQUEOUS SYSTEMS

[75] Inventors: Uno Kruse, Titusville; Burlon C. Crowley, Toms River, both of N.J.; Wilbur S. Mardis, East Amherst, N.Y.

[73] Assignee: Rheox, Inc., Hightstown, N.J.

[21] Appl. No.: 98,146

[22] Filed: Sep. 18, 1987

[51] Int. Cl.$^5$ .................. C08G 18/32; C08G 18/08
[52] U.S. Cl. ................................ 528/49; 528/61; 528/69; 528/76; 528/78; 528/904; 524/591
[58] Field of Search .............. 524/591; 528/69, 904, 528/76, 78, 49

[56] References Cited

U.S. PATENT DOCUMENTS

| | | | |
|---|---|---|---|
| 3,939,105 | 2/1976 | Jones, Jr. et al. | 528/904 |
| 3,940,542 | 2/1976 | Knopf et al. | 528/61 |
| 4,068,035 | 1/1978 | Violland et al. | 528/904 |
| 4,238,594 | 12/1980 | Pampouchidis | 528/69 |
| 4,408,008 | 10/1983 | Markusch | 528/69 |
| 4,496,675 | 1/1985 | Hille et al. | 524/591 |
| 4,499,233 | 2/1985 | Tetenbaum et al. | 528/69 |
| 4,739,094 | 4/1988 | Mazanek et al. | 528/76 |
| 4,745,170 | 5/1988 | Bushman et al. | 528/76 |

Primary Examiner—John Kight, III
Assistant Examiner—Dennis R. Daley
Attorney, Agent, or Firm—Burns, Doane, Swecker & Mathis

[57] ABSTRACT

A water dispersible, modified polyurethane which is the reaction product of polyisocyanate, polyether polyol, modifying agent containing at least one pendant hydrophobic group and at least two active hydrogen moieties and capping agent. The modified polyurethane may also include a second type of modifying agent which does not have a pendant hydrophobic group. The modified polyurethane can be prepared by reacting the polyisocyanate and the polyether polyol and then adding the capping agent and finally the modifying agent with or without the second modifying agent. The modified polyurethane resists microbial attack, exhibits superior efficiency in thickening aqueous compositions under high shear conditions and achieves acceptable sag and leveling.

37 Claims, No Drawings

WATER DISPERSIBLE, MODIFIED POLYURETHANE THICKENER WITH IMPROVED HIGH SHEAR VISCOSITY IN AQUEOUS SYSTEMS

BACKGROUND OF THE INVENTION

1. Field of the Invention

The present invention relates to a water dispersible, modified polyurethane, a thickened aqueous composition containing the modified polyurethane, and a method of increasing the high shear viscosity of an aqueous composition by incorporating the modified polyurethane. The present invention also relates to a method of preparing the modified polyurethane.

2. Description of the Prior Art

It has long been known in the art to use various materials to thicken an aqueous system. Depending on the composition of the aqueous system, the gels produced with these thickeners are useful as decorative and protective coatings, paper coatings, cosmetics and personal care items, adhesives and sealants, inks, petroleum drilling fluids, packer fluids, and the like.

The thickener serves several roles in aqueous systems. In the latex decorative coatings, for instance, the thickener may provide improved stability and pigment suspension, and improved application properties. In cosmetics and personal care items, the thickener will improve body, smoothness and silkiness, thereby making the product more aesthetically pleasing. In petroleum drilling fluids, the thickener improves the suspension of the cuttings, thereby increasing the efficiency with which they can be removed.

Many thickeners, both natural and synthetic, are known in the art. However, all suffer from some disadvantage that limits their usage. Natural thickeners, for instance, include casein, alginates, gum tragacanth, and modified cellulose, including methyl cellulose, hydroxyethyl cellulose, hydroxypropyl cellulose, and carbomethoxy cellulose. These natural products vary in their thickening efficiency, and provide poor flow and leveling properties. Further, they are subject to microbial attack which requires the additional presence of antimicrobial agents.

Synthetic thickeners include various acrylic polymers and maleic anhydride copolymers. Some of these are found to be pH dependent, others are hydrolytically unstable, and others are sensitive to various components normally found in aqueous coatings.

One type of synthetic thickener is a low molecular weight polyurethane characterized by at least three hydrophobic groups interconnected by hydrophilic polyether groups as disclosed in U.S. Pat. Nos. 4,079,028 and 4,155,892. The polyurethane is prepared by reacting at least one water soluble polyether polyol with at least one monofunctional hydrophobic organic compound selected from monofunctional active hydrogen compounds and organic monoisocyanates. The hydrophilic polyether group can be derived from a polyoxyalkylene diol, an adduct of an alkylene oxide and a monofunctional or difunctional reactant or an amino-terminated polyoxyethylene. There may also be present in the reaction mixture at least one water insoluble organic polyisocyanate or at least one polyhydric alcohol or polyhydric alcohol ether.

A mixture of the polyurethane described in U.S. Pat. Nos. 4,079,028 and 4,155,892 and a liquid emulsion polymer made from an addition polymerizable acid, an addition polymerizable nonionic vinyl monomer, and a nonionic vinyl surfactant ester is set forth in U.S. Pat. No. 4,507,426. The use of a related polyurethane in combination with a surfactant co-thickener and a non-aqueous, inert organic diluent to thicken print paste is set forth in U.S. Pat. No. 4,180,491.

Another type of urethane rheology modifying agent which is useful in water and organic solvent based compositions is disclosed in U.S. Pat. No. 4,298,511. The rheology modifier is the reaction product of a polyalkylene oxide, a polyfunctional material having at least 3 active hydrogens or at least 3 isocyanate groups, a diisocyanate and water. The reactants are selected such that there are no terminal hydrophobic groups in the rheology modifying agent.

A urethane thixotropic agent for coating compositions is set forth in U.S. Pat. No. 4,314,924. The thixotropic agent is prepared by reacting a mono-hydroxy compound with a diisocyanate to form mono-isocyanate adduct. The adduct is then converted into a ureaurethane by reaction with a polyamine in an aprotic solvent in the presence of lithium chloride.

In U.S. Pat. No. 3,923,926, a thixotropic polyurethane is prepared by reacting a polyurethane prepolymer having at least two terminal free isocyanate groups and a block polyether compound formed from ethylene oxide and propylene oxide and having at least two terminal secondary alcohol groups. To enhance the thixotropic property, finely divided silica or bentonite may be added.

In order to render the polyurethane insoluble in water and other types of solvents, diamines, dicarboxylic acids and other materials have been used as crosslinking agents. Illustrative of the art disclosing the use of crosslinking agents are J. M. Buist and H. Gudgeon's "Advances in Polyurethane Technology", pages 49 ff, the "Encyclopedia of Polymer Science and Technology", Volume II, pp. 55 ff and 527 and Bernard A. Dunbrow's "Polyurethanes, Second Edition", p. 28.

A further example of a crosslinked polyurethane is disclosed in U.S. Pat. No. 4,293,679. In that patent, solid, discrete, hydrophilic, crosslinked polyurethane particles are formed from a composition which comprises: a) a water reactant; b) a defined isocyanate capped prepolymer; c) a water soluble solvent for b); and d) when the reaction functionality of b) is two, a crosslinking agent containing at least three functional groups.

A different type of crosslinked polyester-urethane is described in U.S. Pat. No. 3,804,810. The polymer is prepared by reacting a) a defined linear polyester, b) at least one organic diisocyanate, and c) at least one crosslinking agent having a functionality greater than 2. The crosslinked polyester-urethane is stated as being useful in adhesives, coating compositions, primers, and for binding magnetic and/or conductive particles to a suitable support.

In U.S. Pat. No. 4,499,233, a water dispersible modified polyurethane is described. The modifying agent has the general formula $X_x$—R—$Y_y$ wherein R represents a group containing from 0 to 10 carbon atoms, X is a group containing at least one active hydrogen moiety selected from the group consisting of primary amino, secondary amino, carboxyl and mixtures thereof. Y is a group containing at least one active hydrogen moiety selected from the group consisting of primary amino, secondary amino, carboxyl, hydroxyl, mercapto and mixtures thereof, the sum of (x+y) is an integer greater than 1 and x is at least 1. Examples of the polyurethane modifying agent are hydrazine, α,ω-amino alkanes, such as 3-cocoamino-1-propylamine, 3-tallowamino-1-propylamine, 3-(hydrogenated tallow)amino-1-propylamine, and N-alkyl-N,N bis(3-aminopropyl) amine, wherein the alkyl group contains one to 22 carbon atoms, dicarboxylic acids, α-amino acids, α-amino-ω-carboxylic acids, hydroxylamines, hydroxy acids, mercaptoamines and mixtures thereof. The disclosed preferred modifying agents are ethylene diamine, 1,6-diaminohexane, 1,10-diaminodecane, N-phenyl-p-phenylenediamine, succinic acid, suberic acid, sebacic acid, 1,10-decanedicarboxylic acid, ethanolamine, 2-(ethylamino)ethanol, and p-carboxy-phenol and mixtures thereof and the disclosed most preferred modifying agent is ethylene diamine. In U.S. Pat. No. 4,436,862, a thermally stable thickener comprised of a defined smectite-type clay and the water dispersible modified polyurethane is set forth.

U.S. Pat. No. 4,496,708 discloses a water-soluble polyurethane comb polymer which is used to thicken aqueous systems. The polyurethane has a hydrophilic polyether backbone and pendant monovalent hydrophobic groups of sufficient size and number while establishing a proper hydrophilic/lipophilic balance. The hydrophobic groups are separated from each end of the polymer by at least one hydrophilic polyether unit. Also see U.S. Pat. No. 4,426,485.

Despite the activity in the art, there has not been produced a water dispersible, modified polyurethane which is useful for increasing the high shear viscosity of an aqueous composition in an efficient manner while still attaining acceptable levels of other important characteristics.

OBJECTS AND SUMMARY OF THE INVENTION

Accordingly, it is a general object of the present invention to solve or substantially alleviate the noted problems in the art.

It is a more specific object of the present invention to provide a water dispersible, modified polyurethane which is useful for increasing the high shear viscosity of an aqueous composition in an efficient manner.

It is another object of the present invention to provide a water dispersible, modified polyurethane which improves the high shear viscosity while obtaining acceptable flow and leveling characteristics in an aqueous composition.

It is another object of the present invention to provide a water dispersible, modified polyurethane which additionally improves the low shear viscosity of an aqueous composition.

It is another object of the present invention to provide a water dispersible, modified polyurethane and an aqueous composition containing the same which resist microbial attack.

It is a further object of the present invention to provide a thickened aqueous composition which comprises water and a water dispersible, modified polyurethane.

It is still a further object of the present invention to provide a method of thickening aqueous compositions.

In one aspect, the present invention provides a water dispersible modified polyether polyurethane polymer, which is the product of the reaction of:

(a) polyisocyanate;

(b) polyether polyol in an amount ranging from about 0.10 to about 10.00 moles per mole of polyisocyanate;

(c) modifying agent in an amount ranging from about 0.015 to about 3.400 moles per mole of polyisocyanate, the modifying agent having at least two active hydrogen moieties and at least one pendant hydrophobic group, said pendant hydrophobic group having at least 10 carbon atoms and having no moieties reactive with the polyisocyanate or the polyether polyol;

(d) capping agent which is reactive with terminal functional groups of the reaction product of the polyisocyanate, the polyether polyol, and the modifying agent and which is present in an amount sufficient to cap the reaction product of the polyisocyanate, the polyether polyol and the modifying agent.

In other aspects, the present invention provides a thickened aqueous composition, a method of increasing the high shear viscosity of an aqueous composition by employing a defined water dispersible, hydrophobically modified polyurethane and a method of preparing a hydrophobically modified polyurethane.

Further advantages and features of the invention as well as the scope, nature and utilization of the invention, will become apparent to those skilled in the art from the following description of the preferred embodiments of the invention.

DESCRIPTION OF THE PREFERRED EMBODIMENTS

As stated herein, the present invention relates to water dispersible modified polyurethane thickeners. The modified polyurethane thickeners are prepared by reacting polyisocyanate, polyether polyol, modifying agent and monofunctional capping agent.

The polyisocyanate contains at least two isocyanate groups per molecule and may be linear or branched, aliphatic, cycloaliphatic or aromatic. The polyisocyanate may also be in the form of a prepolymer having two or more unreacted isocyanate moieties and having an average molecular weight in the range of from about 500 to about 10,000. The preparation of such a prepolymer is well known in the art as demonstrated in aforementioned U.S. Pat. No. 3,923,926, the contents of which are incorporated by reference.

The polyisocyanate preferably contains two isocyanate moieties per molecule. Higher functionality polyisocyanates may be used as a portion of the total isocyanate requirement. However, the use of higher functionality polyisocyanates is limited by the possibility of the formation of a crosslinked, insoluble gel which is unsuitable for purposes of the present invention. Tri- and higher functional polyisocyanates, if used, generally constitute less than about 20 mole % of the total isocyanate minimum requirement. Preferably, tri- and higher functional polyisocyanates constitute less than about 10 mole % and, most preferably, they are absent from the polyisocyanate.

Exemplary polyisocyanates useful in the preparation of the hydrophobically modified polyurethane of the present invention are 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexylene diisocyanate, 4,4'-methylenebis-(isocyanatocyclohexane), 1-isocyanato-3-isocyanatomethyl-3,5,5-trimethylcyclohexane, m- and p-phenylene diisocyanate, 2,6- and 2,4-tolylene diisocyanate, xylene diisocyanate, 4-chloro-1,3-phenylene diisocyanate, 4,4'-biphenylene diisocyanate, 4,4-methylene diphenylisocyanate, 1,5-naphthylene diisocyanate, 1,5-tetrahydronaphthylene diisocyanate, polymethylene polyphenylisocyanates sold under the brand name "PAPI", such as "PAPI 135" (equivalent weight of 133.5 and average isocyanate functionality of 2.7) and "PAPI 901" (equivalent weight of 133 and average isocyanate functionality of 2.3), aromatic triisocyanate adduct of trimethylol propane and tolylene diisocyanate sold under the brand name "Mondur CB-75", aliphatic triisocyanate product of the hydrolytic trimerization of 1,6-hexamethylene diisocyanate sold under the brand name "Desmodur N", $C_{36}$ dimer acid diisocyanate sold under the brand name "DDI", based on dimer acids as discussed in J. Am. Oil Chem. Soc. 51, 522 (1974) and mixtures thereof.

The preferred polyisocyanates are 1,6-hexamethylene diisocyanate, 1-isocyanato-3-isocyanatomethyl-3,5,5-trimethylcyclohexane, the 2,6- and 2,4-tolylene diisocyanates and mixtures thereof. Most preferred are the two tolylene diisocyanate isomers and mixtures thereof and 1,6-hexamethylene diisocyanate.

It is to be understood that the polyisocyanate molecule may contain functional moieties other than isocyanate if these additional moieties are substantially unreactive with either the isocyanate or the active hydrogen groups under the reaction conditions for the preparation of the hydrophobically modified polyurethane thickener of this invention. Consistent with this understanding, the term "polyisocyanate" and the named polyisocyanates encompass such materials unless otherwise indicated. Exemplary moieties which do not adversely affect the reaction include ketones, esters, and aldehydes, amides, particularly N,N-disubstituted amides, halogenated hydrocarbons, ethers and tertiary amines.

The polyether polyol used in the present invention is present in an amount ranging from about 0.10 to about 10.00, preferably from about 0.50 to about 5.00 and most preferably from about 0.60 to about 1.45 moles per mole of polyisocyanate. The polyether polyol is water soluble and may be a homopolymer or a block or random copolymer having the repeating unit:

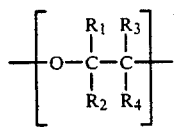

wherein $R_1$, $R_2$, $R_3$ and $R_4$ are independently selected from the group consisting of H, $CH_3$ and $C_2H_5$.

The polyether polyol must have a hydroxyl moiety substantially at each termini of the polyether chain and/or have one end of the polyether chain linked to a central molecule having at least one additional active hydrogen moiety and/or polyether chain attached thereto. This definition therefore includes low molecular weight polyurethane prepolymers having at least two hydroxyl moieties. In this regard, the polyether polyol may also be a three dimensional polyether polyol formed by the combination of at least one of the aforementioned homopolymer, block or random copolymers with a material having three or more moieties onto which the polyether chain may be formed or reacted. Such moieties include amine, carboxylic acid, and hydroxyl functions, and mixtures thereof. Representative examples of these tri- and higher function materials include ethanolamine, glycerol, trimethylol propane, pentaerythritol, sorbitol, malic acid, tartaric acid, and citric acid. However, since the use of a three dimensional polyether polyol may lead to the formation of an insoluble, crosslinked gel which is unsuitable for the present invention, the amount of three dimensional forming material is maintained at less than about 50 equivalent %, preferably less than about 20 equivalent % of the total amount of polyether polyol, and most preferably is in negligible amounts.

The average molecular weight of the polyether polyol is from about 1,500 to about 20,000, preferably from about 2,000 to about 14,000 and most preferably from about 2,000 to about 10,000. Polyether polyols having average molecular weights above about 20,000 form inefficient polyurethane thickeners which are difficult to incorporate. Polyether polyols having average molecular weights of less than about 1,500, while usable, produce inefficient thickeners, particularly in terms of high shear viscosity efficiency with respect to those of the stated average molecular weight ranges.

Exemplary preferred polyether polyols useful for the present invention are polyethylene glycol, random and block copolymers of a group of diols consisting of ethylene glycol, propylene glycol and butylene glycol, and polyether polyol adducts of glycerol, trimethylol propane, and pentaerythritol and mixtures thereof. The most preferred polyether polyol is polyethylene glycol.

The modifying agent is a molecule which is characterized by the presence of at least one pendant hydrophobic group and at least two active hydrogen moieties. In this context, an active hydrogen moiety is defined as one which will react with methylmagnesium bromide to generate methane according to the Zerewitinoff process. Exemplary active hydrogen moieties are primary amino, secondary amino, hydroxy, carboxyl and mercapto. The amount of modifying agent employed in the preparation of the modified polyurethane thickeners of this invention ranges from about 0.015 to about 3.400, preferably from about 0.015 to about 1.000, and most preferably form about 0.050 to about 0.300 moles per mole of the polyisocyanate component.

The modifying agent has at least two active hydrogen moieties and at least one pendant hydrophobic group with the pendant hydrophobic group having at least 10 carbon atoms and having no moieties reactive with the polyisocyanate or the polyether polyol. The pendant hydrophobic group is typically a hydrocarbon group, but it can contain moieties, such as halogen or alkoxy groups, which do not react with the polyisocyanate or polyether polyol and which do not substantially adversely affect the hydrophobic property of the group. The term "pendant" is used to indicate that the hydrophobic group extends from the polymer chain rather than being totally incorporated into the polymer chain.

It is preferred that the modifying agent has only two active hydrogen moieties and that such moieties be located at the termini of the compound. It is additionally preferred that the pendant hydrophobic group or groups have 10 to 22 carbon atoms, more preferably have 10 to 18 carbon atoms and still more preferably have 12 to 18 carbon atoms. It is further preferred that the hydrophobic modifying agent have a single pendant hydrophobic group.

Exemplary modifying agents can be represented by the following general formula:

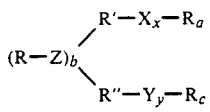

wherein R represents a hydrophobic group containing at least 10 carbon atoms, Z represents a single atom or a small group of atoms to which R, X and Y are attached, X and Y being attached directly or indirectly via R' and R" and R being attached directly or indirectly via a chain containing 1-8 atoms, X represents a group containing at least one active hydrogen moiety selected from the group consisting of primary amino, secondary amino, hydroxyl, carboxyl, mercapto and mixtures thereof, Y represents a group containing at least one active hydrogen moiety selected from the group consisting of primary amino, secondary amino, carboxyl, hydroxyl, mercapto and mixtures thereof, with the proviso that X and Y are not groups which will react with one another under the reaction conditions for preparing the modified polyurethane, R' and R" independently represent an alkyl group containing from 0 to 8 carbon atoms, a polyether chain, a polyester chain, a polyamide chain, all having chain molecular weights of less than about 2,000, and mixtures thereof, x and y are at least 1, the sum of (x+y) is at least 2, a, b and c are integers and the sum of (a+b+c) is at least 1.

The pendant hydrophobic group represented by R may be either linear or branched, saturated or unsaturated and aliphatic or aromatic in nature and contains at least 10 carbon atoms preferably from 10 to 22 carbon atoms and more preferably from 10 to 18 carbon atoms and most preferably from 12 to 18 carbon atoms. R may be further defined in that the simple carboxylic acid (i.e., RCOOH) has a $K_{sp}$ of $10^{-5}$ or less in water at room temperature. Typical examples of R include: decyl, dodecyl, tetradecyl, hexadecyl (cetyl), octadecyl (stearyl), behenyl, 12-hydroxystearyl, octylphenyl and nonylphenyl, soya, coco, tallow, hydrogenated tallow, oleyl and mixtures thereof. Of these, dodecyl, cetyl, stearyl, coco, tallow and hydrogenated tallow are preferred with coco, tallow and hydrogenated tallow being most preferred.

The X and Y groups can be independently selected from the group consisting of: amino groups other than tertiary amino groups; hydroxyl moieties; carboxylic acid moieties; mercapto moieties; molecular fragments bearing the above substituents, such as hydroxymethyl, aminoethyl, and carboxymethyl; and mixtures thereof. Preferred X and Y groups are primary and secondary amino groups.

A further requirement is that the X and Y groups are substantially not reactive with each other under the conditions at which the polyurethane is prepared. Thus, for example, although a carboxyl and hydroxyl group will react under certain conditions, under the conditions at which the modified polyurethane is prepared, the two groups will not react. This essentially ensures that the modifying agent is incorporated into the polyurethane molecule rather than creating a separate molecule. The sum of (x+y) must be at least 2, and most preferably is 2. Higher values of (x+y) are allowed, provided that the modified polyurethane thus derived remains water dispersible. In general, this means that the ratio of the modifying agents used in the preparation of the thickeners of this invention to the polyisocyanate component should be at the low end of the stated range for this component if higher values of x and y are employed. In general, the amount of modifying agent having an active hydrogen functionality greater than two is less than about 20 mole %, preferably less than about 10 mole % and most preferably is essentially absent from the total amount of modifying agent.

Typical examples of Z, through which the isocyanate reactive functional groups are attached to the pendant hydrophobic group, include: carbon, such as in the form of acid esters of tri and higher polyols, carbonates of polyols; nitrogen, such as in the form of a tertiary amine or quaternary ammonium or ureas of secondary aminodiols, particularly secondary amino polyoxy alkylenes; phosphorus, in the form of a phosphine or a phosphonium salt; carbocyclic rings, such as cyclopentyl and cyclohexyl; and aromatic rings such as derivates of benzene, napthalene, and anthracene. Of these, carbon and nitrogen in the form of a tertiary amine are preferred.

In the event that b is zero, the X and Y groups can be connected directly or indirectly through R' and/or R": If R' and R" are both present, they can be attached directly or indirectly through a group such as an ether or tertiary amino group, which does not substantially affect the nature of the modifying agent. In the event that b is greater than one, the Z groups can be attached directly or indirectly through a group having the same definition as R' and R" which are exemplified by alkyl radicals containing from 1 to about 8 carbon atoms; polyether radicals, such as polyethylene glycol and polypropylene glycol; polyesters, such as those derived from succinic acid and ethylene glycol and polyesters of caprolactone; polyamides, such as those derived from succinic acid and ethylene diamine and polyamides derived from caprolactam; and mixtures thereof. Preferred are alkyl and polyether radicals.

Typical examples of modifying agents which satisfy the above criteria are:

A. Amines, such as 1,2-diaminododecane; N-coco-1,3-diaminopropane; N-cetyl-1,3-diaminopropane; N-(tallow)-1,3-diaminopropane; N-(hydrogenated tallow)-1,3-diaminopropane; N-oleyl-1,3-diaminopropane; and N-soya-1,3-diaminopropane.

B. Acids, such as 1,4-anthracyl dicarboxylic acid; 1,4-phenanthryl dicarboxylic acid; laurylmalonic acid; laurylsuccinic acid; octadecenylsuccinic acid; and oleylsuccinic acid.

C. Alcohols, such as 1,2-dodecanediol; 1,2-tetradecanediol; 1,2-hexadecandiol; 1,2-octadecanediol; 1,2-eicosanediol; or alcohols having the general formula:

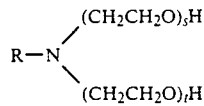

wherein R is the pendant hydrophobic group, s and t are each at least 1 and the sum of (s+t) is from 2 to about 50, preferably from 2 to about 25. Illustrative examples of such diols are available under the name Ethomeen from Akzo Chemie America and include bis[2-hydroxethyl]cocoamine; bis[2-hydroxyethyl]tallowamine; bis[2-hydroxyethyl]cetylamine; bis[2-hydroxyethyl](hydrogenated tallow)amine; bis[polyoxyethylene ethanol]tallowamine; and bis[polyoxyethylene ethanol](hydrogenated tallow)amine. More specific examples of this type of modifying agent are polyoxyethylene (5) cocoamine; polyoxyethylene (10) cocoamine; polyoxyethylene (15) cocoamine; bis(2-hydroxyethyl) octadecylamine; polyoxyethylene (5) octadecylamine; polyoxyethylene (10) octadecylamine; polyoxyethylene (15) octadecylamine; polyoxyethylene (5) octadecylamine; polyoxyethylene (5) tallowamine; polyoxyethylene (15) tallowamine; polyoxyethylene (50) tallowamine; bis(2-hydroxyethyl) oleylamine; polyoxyethylene (5) oleylamine; polyoxyethylene (15) oleylamine; bis(2-hydroxyethyl) soyaamine; polyoxyethylene (5) soyaamine; polyoxyethylene (10) soyaamine; polyoxyethylene (15) soyaamine, wherein the number in parentheses is the sum of (s+t).

Additional alcohols which may be used as the modifying agent are the N,N-substituted fatty acid amides available under the name Ethomid from Akzo Chemie America and which have the following general formula:

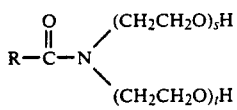

wherein R, s and t have the definitions set forth above.

A further type of alcohol which may be used as a portion of the modifying agent are the reaction products of an N-alkyl trimethylene diamine and an alkylene oxide, such as ethylene oxide, which are available under the name Ethoduomeen from Akzo Chemie America and which have the following general formula:

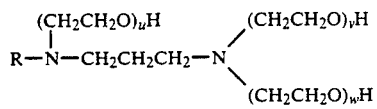

wherein R is the pendant hydrophobic group, at least one of u, v and w is 1 and the sum of (u+v+w) is from 1 to about 15, preferably from 3 to about 10.

Other similar compounds, such as the high molecular weight tertiary amine oxides available from Akzo Chemie America under the name Aromox, can also be used as long as the pendant hydrophobic group is present and the resulting modified polyurethane possesses the desired characteristics.

D. Amino alcohols, such as 1-amino-2-dodecanol; 1-amino-2-tetradecanol; and 1-amino-2-hexadecanol.

E. Amino acids, such as N-coco-beta-aminobutyric acid, and similar compounds having the defined pendant hydrophobic group.

F. Mercaptans, such as 1, 2-hexadecanedithiol and 1,2-octadecanedithiol.

The modified polyurethane thickeners of this invention may be composed of more than one modifying agent, either of the same or different generic type, and unless otherwise stated, the term "modifying agent" encompasses such combinations as long as sufficient modifying agent having the defined pendant hydrophobic group is present so as to obtain an improvement in high shear viscosity.

The incorporation of the modifying agent into the polymer may create linkages which will participate in hydrogen bonding reactions, thus increasing the low shear rate viscosity efficiency. More importantly, however, the high shear rate viscosity efficiency is increased. The reason for this latter observation is believed to be related to an increase in the hydrodynamic drag of the modified polyurethane compared to a polyurethane which does not contain the modifying agent of the present invention.

One skilled in the art of formulating water based emulsion paints will recognize that both the low shear rate and high shear rate viscosity are important. Low shear rate viscosity provides stability against pigment settling and control of sagging during application. High shear rate viscosity provides brush drag which, within reason, is desirable in that it aids in the application of a film of suitable thickness. It has been determined empirically that viscosities of 1.2-2.0 Poise at shear rates of 10,000 $sec^{-1}$ are generally most desirable for emulsion coatings. However, prior art thickeners are inefficient in providing this high shear rate viscosity and therefore require higher loadings of the thickener in order to provide this desired high shear rate viscosity which results in a higher than desirable low shear rate viscosity, together with higher costs and a general detraction from the properties of the applied film, such as increasing the water sensitivity.

As the name indicates, the capping agent is used to cap the ends of the polymer chain. This prevents further reaction of the chain ends which might cause the polymer to become water insoluble. Additionally, the use of the capping agent reduces the toxicity of the polymer and, most importantly, increases the low shear viscosity efficiency thereof by imparting a hydrophobic nature to the ends of the polymer chain.

The capping agent is present in an amount ranging from about 0.01 to about 1.00, preferably from about 0.05 to about 0.50 and most preferably from about 0.10 to about 0.35 moles per mole of polyisocyanate. The capping agent is a linear or branched, aliphatic, cycloaliphatic or aromatic compound containing a single functional group that is capable of reacting with the end group of the uncapped polymer chain and containing a hydrophobic group. Depending on the reaction conditions and the amounts of the polyether polyol, polyisocyanate and modifying agent(s), the monofunctional capping agent may be either (1) reactive with isocyanate moieties (i.e., contains an active hydrogen) or (2) reactive with active hydrogen moieties.

The capping agent may contain other moieties in addition to that moiety that functions to terminate the polymer chain growth. However, these moieties must not be reactive with either isocyanate or active hydrogen components under the reaction conditions used in the preparation of the modified polyurethane of this invention. Such moieties include ketones, aldehydes, esters, hydrogenated hydrocarbons, tertiary amines, ethers and amides, particularly N,N-disubstituted amides.

As stated earlier, the capping agent may be reactive with either an isocyanate moiety or an active hydrogen compound, and the selection of a particular capping agent is dependent on the reaction conditions and molar quantities of the other reactants. If the reaction conditions are chosen such that the uncapped modified polyurethane is substantially isocyanate-terminated, the capping agent should contain one active hydrogen moiety capable of reacting with an isocyanate moiety. Such active hydrogen moieties include hydroxyl, carboxyl, mercapto and primary and secondary amino. Representative examples of hydroxyl compounds that may be useful as capping agents include: octanol, decanol, dodecanol (lauryl alcohol), tetradecanol, hexadecanol, stearyl alcohol and 2-ethylhexanol; phenolics, such as phenol and cresol; alkylphenols, such as octylphenol, nonylphenol and dodecylphenol; and alkyl and aryl polyether alcohols, such as the polyethylene oxide adducts of lauryl alcohol, octylphenol and nonylphenol.

Examples of carboxylic acids that are useful as capping agents include: $C_8$ to $C_{22}$ alkyl carboxylic acids, such as octanoic acid, decanoic acid, dodecanoic acid, tetradecanoic acid, hexadecanoic acid, octadecanoci acid (stearic acid), eicosanoic acid, docosanoic acid; naturally occurring mixtures of acids, such as coco acids, tallow acids, rapeseed acids and the hydrogenated forms of these acids; aromatic acids, such as benzoic acid and naphthenoic acids; alkyl substituted aromatic acids, such as octylbenzoic acid and dodecylbenzoic acid; alicyclic acids, such as cyclopentane carboxylic acid, cyclohexanecarboxylic acid and cyclooctanecarboxylic acid; and alkoxypropyl acids derived from the Michael addition of alcohols to acrylic acid, such as 3-octyloxypropanoic acid, 3-dodecyloxypropanoic acid and 3-octadecyloxypropanoic acid.

Mercaptans useful as capping agents include octyl mercaptan, decylmercaptan, dodecylmercaptan, tetradecylmercaptan, hexadecylmercaptan, octadecylmercaptan and the like.

Both primary and secondary amines may be used as capping agents in the preparation of the hydrophobically modified polyurethanes of this invention. Particularly useful are those amines that contain at least one alkyl chain having from 8 to 22 carbon atoms or an aromatic amine. If the amine is a secondary amine (i.e., has two organic radicals attached to a nitrogen), the two radicals may be the same or different. Suitable examples of primary amines useful in this invention are: octylamine, decylamine, dodecylamine, tetradecylamine, hexadecylamine, octadecylamine, eicosylamine and docosylamine, natural mixtures, such as cocoamine, tallow amine, soya amine, behenylamines; alkoxypropylamines, such as 3-octyloxypropylamine, 3-dodecyloxypropylamine, 3-stearyloxypropyl amine; aromatic amines, such as benzylamine, 1-naphthylamine and 2-naphthylamine. Examples of secondary amines include dioctylamine, didecylamine, didodecylamine, ditetradecylamine, dihexadecylamine, dioctadecylamine, dieicosylamine, didocosylamine, methyloctylamine, methyldodecylamine, methyloctadecylamine, methylbenzylamine, allylbenzylamine, allyloctadecylamine, benzyloctadecylamine; and natural mixtures, such as dicocoamine, ditallowamine, bis[hydrogenated tallow]amine, disoyaamine and the like. Also useful in the preparation of the modified polyurethane of this invention are the 3,3-dialkylamine-1-propylamine compounds, such as 3,3-dimethylamino-1-propylamine, 3,3-dioctyl-1-propylamine, 3,3-ditallow-1-propylamine and the like. Tertiary amines, however, are not useful as capping agents in the preparation of the modified polyurethane of this invention unless they contain another active hydrogen moiety, since tertiary amines do not contain an active hydrogen.

In those instances wherein the polymerization reaction results in a polymer chain terminating with an active hydrogen moiety, the capping agent is a mono functional compound reactive with active hydrogen moieties and is preferably a monoisocyanate. This situation can be arranged by employing a total number of equivalents of active hydrogen moieties derived from the polyether polyol, modifying agent, and, optionally, a second modifying agent, which is greater than the number of equivalents of isocyanate provided by the polyisocyanate. After this intermediate is formed, it may then be capped using a monoisocyanate in an amount such that the total number of equivalents of isocyanate derived from the polyisocyanate and monoisocyanate is equal to or greater than the total number of equivalents of active hydrogen.

Suitable examples of monoisocyanate capping agents useful in the preparation of the hydrophobically modified polyurethane of this invention are: $C_8$ to $C_{22}$ alkyl isocyanates, such as 1-isocyanatooctane, 1-isocyanatodecane, 1-isocyanatododecane, 1-isocyanatotetradecane, 1-isocyanatohexadecane, 1-isocyanatooctadecane, 1-isocyanatoeicosane, and 1-isocyanatodocosane; cycloaliphatic isocyanates, such as isocyanatocyclohexane and isocyanatocyclododecane; aromatic isocyanates, such as phenyl isocyanate; and monoisocyanates formed by the selective reaction of active hydrogen compounds with polyisocyanate compounds such that only one isocyanate function remains, such as those which are formed by the reaction of $C_8$ to $C_{22}$ alcohols with isophorone diisocyanate.

In all cases, the preferred capping agent contains from 8 to 30 carbon atoms and/or an aromatic ring, more preferred are aliphatic compounds containing 10 to 22 carbon atoms, and most preferred are aliphatic compounds containing 12 to 18 carbon atoms. Of the various types of capping agents described, the alcoholic, amino, and isocyanate are preferred, with the alcoholic and amino types being most preferred.

Optionally, the modified polyurethane thickeners may contain a second type of modifying agent which can have the formula:

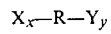

$$X_x\text{—}R\text{—}Y_y$$

wherein R represents a group containing from 0 to 10 carbon atoms, X and Y represent a group containing at least one active hydrogen moiety independently selected from the group consisting of primary amino, secondary amino, carboxyl, hydroxyl, mercapto and mixtures thereof, x and y are at least 1, the sum of (x+y) is at least 2 and most preferably is 2 with the proviso that the second type of modifying agent does not have a pendant hydrophobic group. Illustrative modifying agents of this type, such as ethylene diamine, are described in U.S. Pat. No. 4,499,233, the contents of which are incorporated by reference.

More than one of the second type of modifying compounds may be used in combination in the preparation of the modified polyurethane according to this invention and term "second type of modifying agent" encompasses such combinations unless otherwise stated. The second type of modifying agent is incorporated into the polymer chain and creates linkages which are believed to participate in hydrogen bonding. This improved hydrogen bonding permits the modified polyurethane to thicken aqueous compositions in a highly efficient manner.

The second type of modifying agent can be present in the modified polyurethane in an amount ranging up to about 2.000, preferably up to about 0.300 mole per mole of polyisocyanate and replaces a corresponding amount of the modifying agent of the present invention, but most preferably is absent, since its presence dilutes the effectiveness of the modifying agent of the present invention.

The amount of the second type of modifying agent may include a portion of tri or higher functional material. However, if a tri or higher functional modifying agent is used, the amount must be limited in order to avoid gelation of the hydrophobically modified polyurethane into a water insoluble gel. Typically, this involves the use of less than about 20 mole %, preferably less than about 10 mole % and most preferably a tri or higher functional modifying agent is absent from the total amount of the second type of modifying agent.

The amounts of tri and higher functional polyisocyanate, polyether polyol and modifying agent, and, optionally, the second type of modifying agent, set forth in this specification should be viewed as general guidelines. Additional guidelines exist in the literature as exemplified in the section entitled "Theory of Gelation" in "Advances in Chemistry Series (No. 34) Polymerization and Polycondensation Processes", edited by R. F. Gould, 1962, and published by the American Chemical Society, the contents of which are incorporated by reference. Whatever guideline is selected, the key criterion is that the total amount of tri or higher functional reactants must be less than the amount necessary to form a crosslinked, water insoluble gel.

As is known in the art, the actual maximum amount of each reactant permitted so as to avoid gelation will vary depending on the chemical nature of the reactant, and its functionality, the amounts, chemical natures and functionalities of the other reactants and the degree of polymerization of the overall modified polyurethane. Thus, the present invention will encompass an embodiment in which the amount of a particular reactant may be composed of a percentage of a tri or higher functional material which is greater than the amount stated in the specification if a water insoluble gel is not obtained. Conversely, the present invention will not encompass an embodiment wherein a water insoluble gel is obtained even though the amount of tri or higher functional material may be below the stated limit.

Although the molar ranges for all of the components for the preparation of the modified polyurethane thickeners of this invention are described, it should be understood that most preferred, but not limited to, are compositions in which the number of equivalents of active hydrogen compounds and active hydrogen reactive compounds are equal.

Preparation of the modified polyurethane thickeners of this invention is carried out by reacting together the polyether polyol, polyisocyanate, modifying agent, capping agent, and, optionally, the second type of modifying agent under substantially anhydrous conditions. When low molecular weight polyether diols (i.e., below about 5000 weight) are employed as a part or as the total of the polyether polyol requirement, and when the weight average molecular weight of the resulting product is less than about 40,000, then the thickeners of this invention may be prepared in the absence of any solvent. If a solvent is used, it may constitute only a portion of the final reaction mixture, preferably from about 10% to about 80% and more preferably from about 10% to about 50% of the mixture. One skilled in the art of the synthesis of such products would recognize that it is desirable to maintain as high reaction solids as possible commensurate with the ability to maintain agitation.

The solvent, if used, must itself be substantially anhydrous, or made so prior to addition of any isocyanate compound to the reaction mixture. Suitable solvents useful in the preparation of the modified polyurethane of the present invention include: aromatic hydrocarbons, such as benzene, toluene, and xylenes; glycol ether solvents, such as glyme (glycol dimethyl ether) and diglyme; polar organic solvents, such as dimethylformamide, methylsulfoxide, 1-methyl-2-pyrrolidinone, 1-butyl-2-pyrrolidinone, dimethylacetamide, gamma-butyrolactone, gamma-butyrolactam, dioxane and acetonitrile.

The preferred solvent for the preparation of the modified polyurethane of this invention is toluene because (1) of its ability to azeotropically remove water from the reactants and the reaction mixture and (2) because the boiling point allows easy isolation of the modified polyurethane after the completion of the reaction. Most preferred, however, is to carry out the reaction in the absence of a solvent.

The reaction may be carried out in any vessel known to those of ordinary skill in the art as capable of handling the preparation of polyurethane. For example, the vessel may be equipped with an outlet for gas, may have temperature control and agitation means and may be constructed of glass, stainless steel, or carbon steel. Into the vessel is charged the solvent, if any, and the polyether polyol. To ensure that the reaction proceeds in a substantially anhydrous environment, the polyether polyol and the solvent may be subjected to a drying step, such as by azeotropic drying, and the reaction may occur under inert gas atmosphere, such as a nitrogen atmosphere.

The material is brought to a temperature in the range of from about 20° to about 150° C. To facilitate the reaction, from about 0.005% to about 1.000% by weight of the total reactants of a conventional urethane catalyst is added. Such catalysts are exemplified by catalytically active compounds of bismuth, lead, tin, titanium, iron, antimony, uranium, cadmium, cobalt, thorium, aluminum, mercury, zinc, nickel, vanadium, cerium, as well as magnesium oxide, barium oxide, tertiary amines, pyrones, lactams and acids, with the preferred catalyst being dibutyltin dilaurate.

To the reaction vessel is then added the polyisocyanate, the modifying agent, the capping agent, and the second type of modifying agent, if used. The order of addition of these components to the reaction vessel is unimportant with respect to this invention, as long as the formation of high polymers of the polyisocyanate and the modifying agent and/or the optional modifying agent is essentially precluded, and the reaction proceeds to produce a high molecular weight modified polyether polyurethane polymer in which the distribution of the components is relatively uniform. A preferred order of addition is to add the polyisocyanate to the anhydrous polyether polyol and allow sufficient time for the quantitative consumption of the polyether polyol by reaction with the polyisocyanate, followed by addition of the modifying agent, the capping agent, and, optionally, the second type of modifying agent. More preferred is to add the polyisocyanate to the anhydrous polyether polyol and allow sufficient time for the quantitative consumption of the polyether polyol by reaction with the polyisocyanate, followed by addition of the capping agent and, optionally, the second type of modifying agent, followed, after allowing sufficient time for these reactions to proceed to completion, by addition of the modifying agent of the present invention.

In the event that the capping agent has an active hydrogen moiety, a further preferred method is to mix the polyether polyol and capping agent, react the polyisocyanate with this mixture and then add the modifying agent of the present invention, with or without the second type of modifying agent.

The reactions involved in the preparation of the modified polyether polyurethane thickener of this invention are carried out at temperatures in the range of from about 20° to about 150° C., preferably from about 40° to about 100° C., and most preferably from about 50° to about 80° C. Total reaction times range from about 0.1 to about 48 hours, preferably from about 1.5 to about 6.0 hours, and most preferably from about 2.0 to 4.0 hours. The reaction conditions are selected such that substantially no side reactions occur. Thus for instance, the reaction temperature is selected such that essentially no depolymerization of the polyether polyol occurs within the selected reaction time, and such that essentially no reaction occurs between the formed urea and carbamate moieties and the polyisocyanate.

In the event that gaseous by-products are produced during the reaction, such as the formation of carbon dioxide during the formation of amide linkages via reaction of an isocyanate moiety from either the polyisocyanate or capping agent with a carboxylic acid moiety from either the hydrophobic modifying agent or the optional second modifying agent, they may be removed from the reaction vessel.

If a water insoluble reaction solvent is employed, then, after completion of the reactions, the polymer of this invention is isolated, such as by evaporation of the solvent or precipitation of the polymer by addition of, e.g., a quantity of aliphatic hydrocarbon solvent sufficient to cause precipitation. If the polymer is precipitated, then it should be freed of occluded solvents before continuing. The isolated polymer may then be cooled to a temperature below its glass transition temperature, such as to about 25° to about −100° C., preferably from about 0° to about −100° C., such as by admixing with dry ice or liquid nitrogen, and ground to a small particle size suitable to expedite incorporation into an aqueous composition.

Alternatively, the polymer may be transferred into a water miscible solvent, preferably one having a higher boiling point than the reaction solvent, by addition of that solvent to the reaction mixture and removing by distillation some or all of the water insoluble solvent.

The modified polyurethane of the present invention is resistant to microbial attack and is a superior thickening agent for aqueous compositions. Typical aqueous compositions which may include the modified polyurethane of the present invention are paints, coatings, synthetic plaster, cosmetics, personal care items, adhesives, sealants, inks, drilling fluids, packer fluids and any other aqueous compositions requiring thickening.

The modified polyurethane may be incorporated into aqueous compositions in amounts ranging from about 0.005% to about 10%, preferably from about 0.01% to about 3.00% and most preferably from about 0.05% to about 1.00% by weight. The modified polyurethane is mixed into the aqueous composition using conventional mixing equipment such as high speed dispersers, ball mills, sand mills, pebble mills, paddle mixers, and other such mixing equipment. The modified polyurethane may be in the form of a dry powder, a premixed aqueous gel or a slurry or solution in a water compatible solvent. In this later regard, a solvent may be selected to prepare the modified polyurethane so that it may be directly mixed into the aqueous composition. Of course, the composition may normally contain other known ingredients, such as pigments, surfactants, defoamers, preservatives, etc. in known combinations and amounts depending on the particular end use.

One important characteristic of the modified polyurethane of the present invention is the fact that it is water dispersible. That is, the polymer readily disperses in most aqueous systems to form a colloidal or micellar dispersion therein. In particular, the modified polyurethane thickener of this invention is infinitely compatible, once dispersed, with water over a wide range of temperatures without later separation on standing.

The modified polyurethane also exhibits a high level of efficiency as a thickening agent. As used in the context of the present invention, efficiency is determined by the increase in viscosity caused by the addition of a certain amount of the modified polyurethane to an aqueous composition.

Additionally, the modified polyurethane of the present invention imparts superior leveling characteristics to aqueous compositions. This enables water-based paint formulations to be prepared which do not unduly sag or flow when applied to a vertical surface.

The present invention is exemplified and compared in the following examples.

Comparative Example A

To a 500 ml, 3-necked glass flask equipped with a nitrogen sweep, thermometer, stirrer, Dean-Stark trap, condenser and heating mantle is added 250 ml of toluene and 88.35 grams (0.01 mole) of polyethylene glycol obtained from Union Carbide Corporation which has a hydroxyl value of 12.7 and an average molecular weight of 8835 (0.02 OH equivalents). The mixture is azeotroped dry using a nitrogen sweep at about 110° C., the Dean-Stark trap is replaced by a septum arrangement and the mixture is cooled to 75° C.

To the flask is added 0.08 grams of dibutyltin dilaurate using a pipette and 2.1 grams of 1,6-hexane diisocyanate (0.0125 mole, 0.0250 NCO equivalents) using a syringe and 0.075 grams (0.00125 mol) of ethylene diamine. The reaction mixture is held for 3 hours at 75° C. and then 0.462 grams (0.025 mol) of dodecylamine is added. After an additional hour, the mixture is cooled and poured into a large evaporation dish to allow the solvent to evaporate.

Comparative Examples B-E

In these Examples the dodecyl amine capping agent of Comparative Example A was replaced as follows:
Comparative Example B: 0.465 grams of lauryl alcohol
Comparative Example C: 0.53 grams of tetradecyl amine
Comparative Example D: 0.6 grams of hexadecyl amine.
In Comparative Example E, the ethylene diamine of Comparative Example A is replaced with an equimolar amount of 1,12-dodecyl diamine.

EXAMPLE 1

To a 500 ml, 3-necked flask equipped with a nitrogen sweep, thermometer, stirrer, Dean-Stark trap, condenser, and heating mantle is added 250 ml of toluene and 80 g (0.01 mol) of polyethylene glycol obtained from Union Carbide Corporation which has an average molecular weight of 8000. The mixture is azeotroped dry using a nitrogen sweep at about 110° C. and the mixture is cooled to 75° C.

To the flask is added 0.06 g of dibutyltin dilaurate and 2.1 g (0.0125 mol) of 1,6-hexane diisocyanate. The reaction mixture is held at 75° C. for 3 hours and then 0.348 g (0.00125 mol) of N-coco-1,3-diaminopropane is added. After 30 minutes at 75° C., 0.462 g (0.0025 mol) of dodecylamine is added. After 1 more hour at 75° C. the mixture is cooled and poured into a large evaporation pan to isolate the solid product from the solvent.

The solid product is dissolved in a 4:1 mixture of water and 2-(2-butoxyethoxy)ethanol to give a 20% solids solution of thickener.

EXAMPLES 2-9

In other examples, the N-coco-1,3-diaminopropane and dodecylamine are replaced with other modifying agents of the present invention and capping agents in the same molar quantities as above. The overall compositions are shown in Table 1.

EXAMPLE 10

Example 1 was repeated using 34 grams (0.01 mol) of polyethylene glycol obtained from Union Carbide Corporation which has an average molecular weight of 3400 and 150 ml of toluene, followed by 0.06 grams of dibutyltin dilaurate, 2.24 grams (0.0133 mol) of 1,6-hexane diisocyanate, 0.712 grams (0.0033 mol) of tetradecanol, and 0.464 grams (0.00167 mol) of N-coco-1,3-diaminopropane. The overall composition is shown in Table I.

EXAMPLE 11

Example 10 is repeated by replacing N-coco-1,3-diaminopropane with 0.6 grams (0.00117 mol) of N-hydrogenated tallow-1,3-diaminopropane.

TABLE I

| Example | Modifier | Polyether | Polyisocyanate | N | Capping Agent |
| --- | --- | --- | --- | --- | --- |
| Comparative A | Ethylene diamine | PEG-8000 | hexane diisocyanate | 4 | $C_{12}NH_2$ |
| Comparative B | Ethylene diamine | PEG-8000 | hexane diisocyanate | 4 | $C_{12}CH$ |
| Comparative C | Ethylene diamine | PEG-8000 | hexane diisocyanate | 4 | $C_{14}NH_2$ |
| Comparative D | Ethylene diamine | PEG-8000 | hexane diisocyanate | 4 | $C_{16}NH_2$ |
| Comparative E | 1,12-dodecyl diamine | PEG-8000 | hexane diisocyanate | 4 | $C_{12}NH_2$ |
| 1 | N-coco-1,3-diaminopropane | PEG-8000 | hexane diisocyanate | 4 | $C_{12}NH_2$ |
| 2 | N-coco-1,3-diaminopropane | PEG-8000 | hexane diisocyanate | 4 | $C_{12}CH$ |
| 3 | N-coco-1,3-diaminopropane | PEG-8000 | hexane diisocyanate | 4 | $C_{14}NH_2$ |
| 4 | N-coco-1,3-diamino propane | PEG-8000 | hexane diisocyanate | 4 | $C_{16}NH_2$ |
| 5 | N-tallow-1,3-diaminopropane | PEG-8000 | hexane diisocyanate | 4 | $C_{12}NH_2$ |
| 6 | N-hydrogenated tallow-1,3-diaminopropane | PEG-8000 | hexane diisocyanate | 4 | $C_{12}NH_2$ |
| 7 | N-tallow-1,3-diaminopropane | PEG-8000 | hexane diisocyanate | 4 | $C_{14}NH_2$ |
| 8 | bis[2-hydroxyethyl]-cocamine | PEG-8000 | hexane diisocyanate | 4 | $C_{12}NH_2$ |
| 9 | bis[2-hydroxyethyl]-octadecylamine | PEG-8000 | hexane diisocyanate | 4 | $C_{12}NH_2$ |
| 10 | N-coco-1,3-diaminopropane | PEG-3400 | hexane diisocyanate | 3 | $C_{14}CH$ |
| 11 | N-hydrogenated tallow-1,3-diamino propane | PEG-3400 | hexane diisocyanate | 3 | $C_{14}CH$ |

VINYL ACRYLIC LATEX PAINT FORMULATION

Samples of the material prepared in accordance with Comparative Examples A-E and Examples 1-11 are incorporated into a flat vinyl-acrylic screening composition prepared according to the formulation set forth in Table II.

TABLE II

| Component | Description | Pounds | Gallons |
| --- | --- | --- | --- |
| Water | | 200.0 | 24.01 |
| Tamol 731* | Anionic, polymer-type of dispersant available from Rohm & Haas Co. | 6.0 | 0.65 |
| Tergitol NP-10* | Ethoxylated nonyl phenol available from Union Carbide Corp. | 1.0 | 0.11 |
| Ethylene Glycol | | 15.0 | 1.61 |
| Texanol* | 2,2,4-Trimethyl-1,3-pentanediol isobutyrate coalescent available from Eastman Chemical Products, Inc. | 12.0 | 1.53 |
| Colloid 581B* | Liquid defoamer available from Colloids, Inc. | 4.0 | 0.50 |
| Nuosept 95* | Preservative, available from Tenneco Chemicals, Inc. | 1.0 | 0.10 |
| Titanox 2030* | Titanium dioxide pigment available from NL Industries, Inc. | 250.0 | 7.99 |
| Camel Carb* | Calcium carbonate, available | 125.0 | 5.54 |

TABLE II-continued

| Component | Description | Pounds | Gallons |
|---|---|---|---|
| | from Genstar Stone Products Co. | | |
| Al-Sil-Ate* | Aluminium silicate, available from Freeport Kaolin Co. | 75.0 | 3.40 |
| Beaverwhite* | Talc, available from Cyprus Industrial Minerals Co. | 50.0 | 2.11 |
| Water | | 159.8 | 19.18 |
| UCAR 367* | PVA Resin, available from Union Carbide Corp. | 274.2 | 30.30 |
| Triton N57* | Anionic surfactant available from Rohm & Haas Co. | 2.0 | 0.23 |
| NH4OH | | 4.0 | 0.48 |
| | | 1179.0 | 97.68 |
| 20% Solution of Thickener | | 20.0 | 2.32 |

*Indicates trademarked items.

The vinyl/acrylic resin white latex screening composition is prepared as follows:

A high speed dispersator with tachometer is used with a powerstat to control rotational speed. A 4 inch saw toothed, Cowles type blade is used with a 5 gallon stainless steel beaker. The blade is positioned about 1 to 2 inches from the bottom of the beaker during the grind.

The grind materials, which include water, Tamol 731, Tergitol NP-10, ethylene glycol, Texanol 581B, Titanox 2030, Nuosept 95, Camel Carb, Al-Sil-Ate and Beaverwhite are added to the beaker while stirring to ensure a homogeneous mix. Stirring is increased to 5400 RPM and the grind is continued for 15 minutes.

Stirring is slowed to under 2000 RPM and the water, UCAR 367, Triton N57 and NH4OH are added sequentially. Stirring is continued until the masterbatch is thoroughly mixed.

To one pint cans, 310.9 grams of the masterbatch is added. A Cowles dispersator equipped with a 2.5 inch saw toothed blade is used to stir in the aqueous dispersions of the Comparative and Inventive thickeners. Stirring is continued, at a rate so as not to allow air to be pulled into the mix for five minutes. With the exception of Examples 10 and 11, the thickeners were evaluated at 4.0 and 6.0 pounds per 100 gal. The results are shown in Table III, and demonstrate the improvement in ICI efficiency to be derived by the use of hydrophobic modifying agents.

TABLE III
COMPARISON OF HYDROPHOBICALLY MODIFIED THICKENERS WITH NON-HYDROPHOBICALLY MODIFIED THICKENERS

Vinyl/Acrylic Latex Paint Formulation

| | 4 pphg Loading | | 6 pphg Loading | |
|---|---|---|---|---|
| Example | Stormer (KU[1]) | ICI (Poise[2]) | Stormer (KU) | ICI (Poise) |
| Comparative A | Too Low | — | 77 | 1.7 |
| Comparative B | 69 | 1.2 | 83 | 1.8 |
| Comparative C | 78 | 1.1 | 89 | 2.2 |
| Comparative D | 106 | 1.1 | 130 | 1.9 |
| Comparative E | Too Low | — | 86 | 2.6 |
| 1 | 74 | 1.8 | 91 | 3.1 |
| 2 | 102 | 1.9 | Too High | — |
| 3 | 97 | 1.5 | Too High | — |
| 4 | 130 | 1.5 | Too High | — |
| 5 | 90 | 1.9 | 124 | 3.0 |
| 6 | 98 | 1.9 | Too High | — |
| 7 | 118 | 1.9 | Too High | — |
| 8 | Too Low | — | 90 | 2.9 |
| 9 | Too Low | — | 94 | 2.8 |
| 10* | 117 | 0.9 | — | — |
| 11* | Too High | — | — | — |

[1]Krebs Units, low shear viscosity as measured with a Krebs-modified Stormer Viscometer.
[2]High shear viscosity as measured on the ICI Cone and Plate Viscometer (Research Equipment, London) operating at about 10,000 sec.$^{-1}$ shear rate.
*These examples were rerun at a loading of 3 pphg and yielded Stormer viscosities of 97 KU and 99 KU and ICI viscosities of 0.6 poise and 0.5 poise, respectively.
pphg = pounds per 100 gal.

ACRYLIC RESIN TINT BASE FORMULATION

Samples of the material prepared in accordance with comparative Examples 1-4 and Examples 1-2 are incorporated into an exterior tint base screening composition prepared according to the formulation set forth in Table IV.

TABLE IV

| Component | Description | Pounds | Gallons |
|---|---|---|---|
| Water | | 242.4 | 29.10 |
| Nuosept 95* | Preservative, available from | 1.3 | 0.13 |
| NDW* | Defoamer, available from Diamond Shamrock Chemicals Co. | 2.0 | 0.26 |
| Triton N57* | Anionic surfactant available from Rohm & Haas Co. | 1.0 | 0.26 |
| Tamol 731* | Anionic, polymer-type of dispersant, available from Rohm & Haas Co. | 11.5 | 1.25 |
| Nuosept 95* | Preservative, available from Tenneco Chemicals, Inc. | 3.3 | 0.33 |
| Titanox 2020* | Titanium dioxide pigment, available from NL Industries, Inc. | 170.0 | 5.11 |
| Minex 7* | Silica, available from Indusmin Limited | 175.6 | 8.03 |
| Omyacarb* | Calcium carbonate, available from OMYA, Inc. | 25.0 | 1.11 |

TABLE IV-continued

| Component | Description | Pounds | Gallons |
|---|---|---|---|
| Water | | 25.0 | 3.00 |
| UCAR Acrylic 515* | Terpolymer acrylic emulsion resin available from Union Carbide Corp. | 399.3 | 43.88 |
| Texanol* | 2,2,4-Trimethyl-1,3-pentanediol isobutyrate coalescent available from Eastman Chemical Products, Inc. | 16.0 | 2.04 |
| Ethylene Glycol | | 20.0 | 2.15 |
| NH$_4$OH | | 3.0 | 0.36 |
| NDW* | Defoamer, available from Diamond Shamrock Chemicals Co | 1.8 | 0.24 |
| 20% Solution of Thickener | | 1096.2 | 97.10 |

*Indicates trademarked items.

The Acrylic Resin Tint Base screening composition is prepared as follows:

A high speed dispersator with RPM indicator is used with a powerstat to control rotational speed. A 4 inch saw toothed, Cowles type blade is used with a 5 gallon stainless steel beaker. The blade is positioned about 1 to 2 inches from the bottom of the beaker during the grind.

The grind materials, which include water, Nuosept 95, NDW, Triton N57, Tamol 731, Titanox 2020, Minex 7 and Omyacarb are added to the beaker while stirring to ensure a homogeneous mix. Stirring is increased to 5400 RPM and the grind is continued for 15 minutes.

Stirring is slowed to under 2000 RPM and the water, UCAR Acrylic 515, Texanol, ethylene glycol, NH$_4$OH and NDW are added sequentially. Stirring is continued until the masterbatch is thoroughly mixed. This formulation is summarized in Table IV.

To one pint cans, 310.9 grams of the masterbatch is added. A Cowles dispersator equipped with a 2.5 inch saw toothed blade is used to stir in the aqueous dispersion of the thickener. Stirring is continued, at a rate so as not to allow air to be pulled into the mix for five minutes. The loading of thickener was adjusted to give a paint having a Stormer viscosity of between 95 and 105 KU.

To this size batch, 20.8 g of Colorant "F", a red iron oxide pigment dispersion of the type that is normally employed to tint latex paints for the do-it-yourself market, is added. The same mixing equipment as above is used to stir in the colorant. Stirring is continued, at a rate so as not to allow air to be pulled into the mix for five minutes. The loading of colorant is 6.0 oz. per gallon. The Stormer viscosity is measured immediately after completion of mixing.

The results, as given in Table V, demonstrate improvement in ICI efficiency to be derived from the use of the modifying agents in the preparation of modified polyurethane thickeners of the present invention, and the improvement in Stormer efficiency to be similarly derived, together with improved stability to addition of colorants for the modified polyurethane thickeners of the present invention.

TABLE V

COMPARISON OF HYDROPHOBICALLY MODIFIED THICKENERS WITH NON-HYDROPHOBICALLY MODIFIED THICKENERS

| | Acrylic Tint Base Paint Formulation | | | | | | | |
|---|---|---|---|---|---|---|---|---|
| | Before Colorant F | | | | | After Colorant F | | |
| | pphg | (KU) | ICI | Stormer Efficiency | ICI Efficiency[3] | (KU) | ΔKU | ICI |
| Comparative A | 12.5 | 95 | 3.8 | 7. | .304 | 96 | +1 | 4.6 |
| Comparative B | 10.5 | 95 | 3.0 | 9.05 | .286 | 89 | −6 | 3.0 |
| Comparative C | 8.9 | 95 | 2.7 | 10.7 | .303 | 86 | −9 | 2.7 |
| Comparative D | 5.5 | 93 | 1.2 | 16.9 | .218 | 68 | −25 | 0.9 |
| Comparative E | 10.0 | 97 | 4.3 | 9.7 | .430 | 95 | −2 | 4.7 |
| 1 | 9.6 | 94 | 4.0 | 9.8 | .417 | 95 | +1 | 5.0 |
| 2 | 6.0 | 107 | 3.2 | 17.8 | .533 | 96 | −11 | 3.3 |
| 3 | 10.0 | 95 | 3.1 | 9.5 | .310 | 88 | −6 | 3.2 |
| 4 | 7.0 | 102 | 2.4 | 14.9 | .343 | 85 | −17 | 2.7 |
| 5 | 5.7 | 94 | 2.5 | 16.5 | .439 | 86 | −8 | 2.9 |
| 6 | 6.0 | 98 | 3.0 | 16.3 | .500 | 88 | −10 | 2.8 |
| 7 | 5.0 | 99 | 2.2 | 19.8 | .440 | 82 | −17 | 2.0 |
| 8 | 12.0 | 99 | 4.4 | 8.2 | .367 | 97 | −2 | 4.8 |
| 9 | 10.0 | 108 | 4.6 | 10.8 | .460 | 102 | −6 | 5.0 |
| 10 | 5.0 | 97 | 1.4 | 19.4 | .280 | 89 | −8 | 1.8 |
| 11 | 4.7 | 97 | 1.3 | 20.6 | .277 | 86 | −11 | 1.6 |

[1] Krebs Units, low shear viscosity as measured with a Krebs-modified Stormer Viscometer
[2] High shear viscosity as measured on the ICI Cone and Plate Viscometer (Research Equipment, Limited, London) operating at about 10,000 sec.$^{-1}$ shear rate.
[3] Stormer (KU) and ICI (P) viscosity per pound of thickener per 100 gal of paint.

What is claimed is:

1. A water dispersible modified polyurethane thickener for aqueous compositions which is the reaction product of:
   a) polyisocyanate;
   b) polyether polyol in an amount ranging from about 0.10 to about 10.00 moles per mole of polyisocyanate;
   c) modifying agent in an amount ranging from about 0.015 to about 3.400 moles per mole of polyisocyanate, said modifying agent having at least two active hydrogen moieties and at least one pendant hydrophobic group, said pendant hydrophobic group having at least 12 carbon atoms and having no moieties reactive with the polyisocyanate or the polyether polyol; and d) capping agent which is reactive with the reaction product of the polyisocyanate, the polyether polyol and the modifying agent and which is present in an amount sufficient to cap the reaction product of the polyisocyanate, the polyether polyol and the modifying agent, said water dispersible modified polyurethane thickener having improved high shear rate viscosity efficiency compared to a polyurethane which does not contain the modifying agent with said pendant hydrophobic group.

2. The water dispersible, modified polyurethane thickener for aqueous compositions of claim 1 wherein the polyisocyanate is composed of less than about 20 mole % of tri and higher functional polyisocyanates.

3. The water dispersible, modified polyurethane thickener for aqueous compositions of claim 1 wherein the polyisocyanate is selected from the group consisting of 1,6-hexamethylene diisocyanate, 1-isocyanato-3-isocyanato-methyl-3,5,5-trimethyl cyclohexane, 2,4-tolylene diisocyanate, 2,6-tolylene diisocyanate and mixtures thereof.

4. The water dispersible, modified polyurethane thickener for aqueous compositions of claim 1 wherein the polyether polyol is present in an amount ranging from about 0.50 to about 5.00 moles per mole of polyisocyanate.

5. The water dispersible, modified polyurethane thickener for aqueous compositions of claim 1 wherein the average molecular weight of the polyether polyol is from about 1,500 to about 20,000.

6. The water dispersible, modified polyurethane thickener for aqueous compositions of claim 1 wherein the polyether polyol is a homopolymer or a block or random copolymer having the repeating unit:

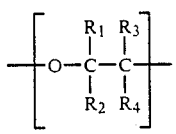

wherein $R_1$, $R_2$, $R_3$ and $R_4$ are independently selected from the group consisting of H, $CH_3$ and $C_2H_5$.

7. The water dispersible, modified polyurethane thickener for aqueous compositions of claim 1 wherein the polyether polyol is composed of less than about 50% equivalent % of three-dimensional polymer forming material.

8. The water dispersible, modified polyurethane thickener for aqueous compositions of claim 1 wherein the modifying agent is present in an amount ranging from about 0.015 to about 1.000 moles per mole of polyisocyanate.

9. The water dispersible, modified polyurethane thickener for aqueous compositions of claim 1 wherein the modifying agent is composed of less than about 20 mole % of compounds having more than two active hydrogen moieties.

10. The water dispersible, modified polyurethane thickener for aqueous compositions of claim 1 wherein the pendant hydrophobic group has from 12 to 18 carbon atoms.

11. The water dispersible, modified polyurethane thickener for aqueous compositions of claim 1 wherein the modifying agent has the formula:

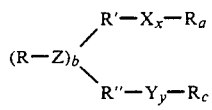

wherein R represents the hydrophobic group containing at least 12 carbon atoms, Z represents a single atom or a small group of atoms to which R, X and Y are attached, X and Y being attached directly or indirectly via R' and R" and R being attached directly or indirectly via a chain containing 1-8 atoms, X represents a group containing at least one active hydrogen moiety selected from the group consisting of primary amino, secondary amino, hydroxyl, carboxyl mercapto and mixtures thereof, Y represents a group containing at least one active hydrogen moiety selected from the group consisting of primary amino, secondary amino, hydroxyl, mercapto and mixtures thereof, with the proviso that X and Y are not groups which will react with one another under the reaction conditions for preparing the modified polyurethane, R' and R" independently represents an alkyl group containing from 0 to 8 carbon atoms, a polyether chain, a polyester chain, a polyamide chain and mixtures thereof, x and y are at least 1, and the sum of (x+y) is at least 2, and a, b and c are integers and the sum of (a+b+c) is at least 1.

12. The water dispersible, modified polyurethane thickener for aqueous compositions of claim 11 wherein Z represents carbon, nitrogen, phosphorus, a carbocyclic ring, an aromatic ring and mixtures thereof.

13. The water dispersible, modified polyurethane thickener for aqueous compositions of claim 12 wherein Z is the nitrogen of a tertiary amine.

14. The water dispersible, modified polyurethane thickener for aqueous compositions of claim 13 wherein a and b are zero and X and Y are hydroxyl groups.

15. The water dispersible, modified polyurethane thickener for aqueous compositions of claim 14 wherein the modifying agent has the formula:

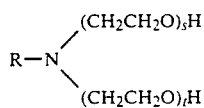

wherein s and t are each at least one and the sum of (s+t) is from 2 to about 50.

16. The water dispersible, modified polyurethane thickener for aqueous compositions of claim 15 wherein the modifying agent is bis[2-hydroxyethyl]tallow amine, bis[2-hydroxethyl]octadecylamine, bis[2-hydroxyethyl]oleylamine, bis[2-hydroxyethyl]soyaamine, polyoxyethylene cocoamine, polyoxyethylene octadecylamine, polyoxyethylene tallowamine, polyoxyethylene oleylamine, polyoxyethylene soyaamine and mixtures thereof.

17. The water dispersible, modified polyurethane thickener for aqueous compositions of claim 14 wherein the modifying agent has the formula:

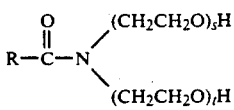

18. The water dispersible, modified polyurethane thickener for aqueous compositions of claim 11 wherein b is zero.

19. The water dispersible, modified polyurethane thickener for aqueous compositions of claim 18 wherein the modifying agent is selected from N-coco-1,3-diaminopropane, N-cetyl-1,3-diaminopropane, N-(tallow)-1,3-diaminopropane, N-(hydrogenated tallow)-1,3-diaminopropane, N-oleyl-1,3-diaminopropane, N-soya1,3-diaminopropane and mixtures thereof.

20. The water dispersible, modified polyurethane thickener for aqueous compositions of claim 16 wherein the modifying agent is selected from 1,2-tetradecanediol, 1,2-hexadecanediol, 1,2-octadecanediol, 1,2-eicosanediol and mixtures thereof.

21. The water dispersible, modified polyurethane thickener for aqueous compositions of claim 1 wherein the modifying agent is selected from laurylmalonic acid, laurylsuccinic acid, octadecenylsuccinic acid, oleylsuccinic acid and mixtures thereof.

22. The water dispersible, modified polyurethane thickener for aqueous compositions of claim 1 wherein the modifying agent is amino alcohol, an amino acid or a mixture thereof.

23. A water dispersible modified polyurethane thickener for aqueous compositions which is the reaction product of:
   a) polyisocyanate;
   b) polyether polyol in an amount ranging from about 0.10 to about 10.00 moles per mole of polyisocyanate;
   c) modifying agent having at least two active hydrogen moieties and at least one pendant hydrophobic group, said pendant hydrophobic group having at least 12 carbon atoms and having no moieties reactive with the polyisocyanate or the polyether polyol;
   d) a second type of modifying agent having the formula:

$$X_x-R-Y_y$$

wherein R represents a group containing from 0 to 10 carbon atoms, X and Y represent a group containing at least one active hydrogen moiety independently selected from the group consisting of primary amino, secondary amino, carboxyl, hydroxyl, mercapto and mixtures thereof, x and y is at least 1 and the sum of (x+y) is at least 2, wherein the second type of modifying agent does not have a pendant hydrophobic group and wherein the total amount of c) and d) is from about 0.015 to about 3.400 moles per mole of polyisocyanate; and
   e) capping agent which is reactive with the reaction product of the polyisocyanate, the polyether polyol, the modifying agent in an amount sufficient to cap the reaction product, said water dispersible modified polyurethane thickener having improved high shear rate viscosity efficiency compared to a polymer which does not contain the modifying agent with said pendant hydrophobic group.

24. A water dispersible modified polyurethane thickener for aqueous compositions which is the reaction product of:
   a) polyisocyanate selected from the group consisting of 1,6-hexamethylene diisocyanate, 1-isocyanate-3-isocyanatomethyl-3,5′,5-trimethylcyclohexane, 2,6-tolylene diisocyanate, 2,4-tolylene diisocyanate and mixtures thereof;
   b) polyether polyol in an amount ranging from about 0.10 to about 10.00 moles per mole of polyisocyanate, said polyether polyol having an average molecular weight in the range of from about 1,500 to about 20,000 and having the repeating unit

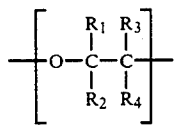

wherein $R_1$, $R_2$, $R_3$ and $R_4$ are independently selected from the group consisting of H, $CH_3$ and $C_2H_5$;
   c) modifying agent in an amount ranging from about 0.015 to about 3.400 moles per mole of polyisocyanate, said modifying agent having at least two active hydrogen moieties and at least one pendant hydrophobic group, said pendant hydrophobic group having at least 12 carbon atoms and having no moieties reactive with the polyisocyanate or the polyether polyol; and
   d) capping agent which is reactive with the reaction product of the polyisocyanate, the polyether polyol and the modifying agent and which is present in an amount sufficient to cap the reaction product of the polyisocyanate, the polyether polyol and the modifying agent, said water dispersible modified polyurethane thickener having improved high shear rate viscosity efficiency compared to a polyurethane which does not contain the modifying agent with said pendant hydrophobic group.

25. The water dispersible modified polyurethane thickener for aqueous compositions of claim 24 wherein the polyisocyanate is 1,6-hexanethylene diisocyanate.

26. The water dispersible modified polyurethane thickener for aqueous compositions of claim 24 wherein the polyether polyol is present in an amount ranging from about 0.50 to about 5.00 moles per mole of the polyisocyanate and has an average molecular weight in the range of from about 2,000 to about 14,000.

27. The water dispersible modified polyurethane thickener for aqueous compositions of claim 26 wherein the polyether polyol is polyethylene glycol.

28. The water dispersible, modified polyurethane thickener for aqueous compositions of claim 24 wherein the modifying agent is selected from N-coco-1,3-diaminopropane, N-cetyl 1,3-diaminopropane, N-(tallow)-1,3-diaminopropane, N-(hydrogenated tallow)-1,3-diaminopropane, N-oleyl-1,3-diaminopropane, N-soya-1,3-diaminopropane and mixtures thereof.

29. A water dispersible modified polyurethane thickener for aqueous compositions which is the reaction product of:
   a) polyisocyanate selected from the group consisting of 1,6-hexamethylene diisocyanate, 1-isocyanate-3-isocyanatomethyl-3,5′,5-trimethylcyclohexane, 2,6-tolylene diisocyanate, 2,4-tolylene diisocyanate and mixtures thereof;

b) polyether polyol in an amount ranging from about 0.10 to about 10.00 moles per mole of polyisocyanate, said polyether polyol having an average molecular weight in the range of from about 1,500 to about 20,000 and having the repeating unit

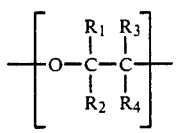

wherein $R_1$, $R_2$, $R_3$ and $R_4$ are independently selected from the group consisting of H, $CH_3$ and $C_2H_5$;

c) modifying agent having at least two active hydrogen moieties and at least one pendant hydrophobic group, said pendant hydrophobic group having at least 12 carbon atoms and having no moieties reactive with the polyisocyanate or the polyether polyol;

d) a second type of modifying agent having the formula:

$$X_x\text{—}R\text{—}Y_y$$

wherein R represents a group containing from 0 to 10 carbon atoms, X and Y represent a group containing at least one active hydrogen moiety independently selected from the group consisting of primary amino, secondary amino, carboxyl, hydroxyl, mercapto and mixtures thereof, x and y is at least 1 and the sum of (x+y) is at least 2, wherein the second type of modifying agent does not have a pendant hydrophobic group and wherein the total amount of c) and d) is from about 0.015 to about 3.400 moles per mole of polyisocyanate; and e) capping agent which is reactive with the reaction product of the polyisocyanate, the polyether polyol, the modifying agent and the second type of modifying agent and which is present in an amount sufficient to cap the reaction product, said water dispersible modifier polyurethane thickener having improved high shear rate viscosity efficiency compared to a polymer which does not contain the modifying agent with said pendant hydrophobic group.

30. A method of preparing a water dispersible modified polyurethane thickener for aqueous compositions which is the reaction product of:

a) polyisocyanate;
b) polyether polyol in an amount ranging from about 0.10 to about 10.00 moles per mole of polyisocyanate;
c) modifying agent in an amount ranging from about 0.015 to about 3.400 moles per mole of polyisocyanate, said modifying agent having at least two active hydrogen moieties and at least one pendant hydrophobic group, said pendant hydrophobic group having at least 12 carbon atoms and having no moieties reactive with the polyisocyanate or the polyether polyol; and
d) capping agent which is reactive with the reaction product of the polyisocyanate, the polyether polyol and the modifying agent and which is present in an amount sufficient to cap the reaction product of the polyisocyanate, the polyether and the modifying agent, said method comprising;
i) adding polyisocyanate to polyether polyol to form a reaction mixture;
ii) adding capping agent to the reaction mixture; and
iii) adding modifying agent to the reaction mixture so as to form the water dispersible modified polyurethane thickener said water dispersible modifier polyurethane thickener having improved high shear rate viscosity efficiency compared to a polyurethane which does not contain the modified agent with said pendent hydrophobic group.

31. The method of claim 30 wherein the method is conducted in the absence of a solvent.

32. The method of claim 30 wherein the method is conducted under substantially anhydrous conditions.

33. The method of claim 30 wherein the water dispersible modified polyurethane thickener is recovered by evaporating any remaining solvent, cooling to at or below the glass transition temperature of the modified polyurethane thickener and comminuting the modified polyurethane thickener to obtain a fine powder.

34. A method of preparing a water dispersible modified polyurethane thickener for aqueous compositions which is the reaction product of:

a) polyisocyanate;
b) polyether polyol in an amount ranging from about 0.10 to about 10.00 moles per mole of polyisocyanate;
c) modifying agent in an amount ranging from about 0.015 to about 3.400 moles per mole of polyisocyanate, said modifying agent having at least two active hydrogen moieties and at least one pendant hydrophobic group, said pendant hydrophobic group having at least 12 carbon atoms and having no moieties reactive with the polyisocyanate or the polyether polyol; and
d) capping agent which contains a single active hydrogen group, and is reactive with the reaction product of the polyisocyanate, the polyether polyol and the modifying agent and which is present in an amount sufficient to cap the reaction product of the polyisocyanate, the polyether and the modifying agent, said method comprising;
i) mixing the polyether polyol and capping agent;
ii) adding the polyisocyanate to the mixture; and
iii) adding modifying agent to the mixture so as to form the water dispersible modified polyurethane thickener, said water dispersible modified polyurethane thickener having improved high shear rate viscosity efficiency compared to a polyurethane which does not contain the modifying agent with said pendant hydrophobic group.

35. The method of claim 34 wherein the method is conducted in the absence of a solvent.

36. The method of claim 34 wherein the method is conducted under substantially anhydrous conditions.

37. The method of claim 34 wherein the water dispersible, modified polyurethane thickener is recovered by evaporating any remaining solvent, cooling to at or below the glass transition temperature of the modified polyurethane thickener and comminuting the modified polyurethane thickener to obtain a fine powder.

* * * * *

UNITED STATES PATENT AND TRADEMARK OFFICE
CERTIFICATE OF CORRECTION

PATENT NO. : 5,023,309
DATED : June 11, 1991
INVENTOR(S) : Kruse, et al

It is certified that error appears in the above-indentified patent and that said Letters Patent is hereby corrected as shown below:

Column 23,

Claim 3, line 24, amend "3,5,5" to -- 3,4,5 --.

Column 24,

Claim 16, line 59, amend "hydroxethyl" to --hydroxyethyl--.

Claim 20, line 18, amend "16" to --18--.

Claim 23, line 32, after "dispersible" insert a comma -- , --;

line 50, amend "10" to --12--;

line 55, amend "I" to --1--; and line 63, after "agent" insert --and which is present--.

Claim 24, line 1, after "dispersible" insert a comma -- , --.

Claim 25, line 44, after "dispersible" insert a comma -- , --.

Claim 26, line 47, after "dispersible" insert a comma -- , --.

UNITED STATES PATENT AND TRADEMARK OFFICE
CERTIFICATE OF CORRECTION

PATENT NO. : 5,023,309
DATED : June 11, 1991
INVENTOR(S) : Kruse, et al

It is certified that error appears in the above-indentified patent and that said Letters Patent is hereby corrected as shown below:

Claim 27, line 53, after "dispersible" insert a comma -- , --.

Claim 29, line 63, after "dispersible" insert a comma -- , --.

Claim 30, line 50, after "dispersible" inset a comma -- , --; and
         line 13, amend "modified" to --modifying--.

Claim 34, line 25, after "dispersible" insert a comma -- , --.

Signed and Sealed this

Twenty-sixth Day of July, 1994

Attest:

BRUCE LEHMAN

Attesting Officer         Commissioner of Patents and Trademarks